Reissued Feb. 4, 1930

Re. 17,580

UNITED STATES PATENT OFFICE

GUSTAVE E. BEHR, JR., OF BROOKLYN, NEW YORK, ASSIGNOR, BY MESNE ASSIGNMENTS, TO MINNESOTA MINING & MANUFACTURING COMPANY, OF ST. PAUL, MINNESOTA, A CORPORATION OF MINNESOTA

ABRASIVE SHEET MATERIAL

No Drawing. Original No. 1,645,037, dated October 11, 1927, Serial No. 581,275, filed August 11, 1922. Application for reissue filed October 10, 1929. Serial No. 398,806.

The invention relates to the manufacture of flexible sheet material coated with grit or abrasive and known in the trade as sandpaper, flint or garnet paper, emery-cloth and the like, according to the kind of coating and the sheet material which carries it. The object is the improvement of goods of this class and of their method of manufacture, and especially the production of a superior and satisfactory quality of waterproof sandpaper by which is meant sandpaper or abrasive sheet material which is not only superior in cutting quality and durability to the common or non-waterproof variety but which can be used wet with water, with still greater efficiency and without impairing or loosening the adhesive which holds the grit or unduly softening or affecting the paper base, and which is tough and pliant and does not become brittle with age and which can also be made to sell within the established price range of goods of this class.

In the preferred form of my invention, as applied for making sandpaper, I proceed as follows: The plain paper stock or cloth, as the case may be, is first immersed in a bath of cotton-seed oil, thinned when necessary by the addition of benzine. The benzine or other thinner hastens impregnation of the oil into the paper fibres, and is later allowed to volatilize. The paper is preferably fed in a continuous strip or ribbon through the oil bath and thence passes through a pair of squeegee rollers to remove any surplus. This operation may be done at ordinary room temperature and its purpose is to make the paper water repellent as later explained. The paper thus treated and waterproofed is then, and if need be immediately, passed over a gluing roller, or through any other suitable means for applying a coating of adhesive to one of its sides. The adhesive thus applied is a varnish of approximately the following composition:

| | Per cent |
|---|---|
| Tung oil | 35 |
| Linseed oil | 8 |
| Rosin | 9 |
| Mineral spirits and dryer | 48 |

but the amount of spirits or other thinner is subject to variation according to the thickness of the coating, and that is determined to some extent by the size or grade of the grit to be applied, as will be understood. The above proportions are by weight, as customary. The paper is then doused or covered with the grit or abrasive material on the side carrying the fresh adhesive and then receives a second or sizing coat of adhesive over the grit, as customary. This sizing agent may be the same varnish as used for the main adhesive but is made somewhat thinner by the addition of benzine or other volatile thinner, and more or less, according to the grade of grit as will also be understood by those versed in this art.

The oiled paper now carrying the grit-holding coating of adhesive is next baked in an oven for a period of about sixteen hours at a temperature of about 200° F., or for a shorter time at a higher temperature but in any event, within the range of temperature commonly employed for setting baking varnishes. Sometimes a preliminary baking for two hours or so is given after the sanding and before the sizing, which is preferable in the case of coarser grit. On removal from the oven the paper may be cut into sheets and is ready for sale.

The baking drives off any volatile constituent left in the paper from the waterproofing bath and thickens but of course does not actually dry the cotton-seed oil, and it also drives off the volatile thinner of the adhesive but more especially its effect and primary purpose is to indurate the solid body of the varnish and convert it into a permanently elastic, water-proof layer which is firmly adherent to the cellulose fibres of the base notwithstanding the greasy or oily character that has been imparted to the latter. The effect is to anchor the grit to the paper fibres with great security.

Instead of cotton-seed oil for the waterproofing agent, I may use any oil or grease or mixture of oils or greases which, like cotton-seed oil, are not soluble in water and are known as "non-drying" or "semi-drying", and if they are not naturally thin enough for quickly and thoroughly penetrating the paper base, they can be made so either by the addition of a volatile thinner as above explained or by heat. I prefer cotton-seed oil because while it is an excellent water-proofing agent, it does not in fact render the paper absolutely immune from the effect of moisture, as manifested by the fact that immersion for a few minutes in water gives the paper base a tougher and more leathery feel than when dry, although a many day immersion in hot water does it no damage whatever. Cottonseed oil is also preferred because it acquires from the baking, a permanently sticky or jelly-like consistency. This, however, is not objectionable or noticeable in the product because the amount present is small and well distributed among the cellulose fibres, but its effect is to tie the fibres together with some freedom for relative slipping of one on the other and without breaking, as they would do if positively bonded, thus giving the paper base greater toughness and a permanent suppleness, or pliability. Other non-drying or semi-drying oils possessing these properties, though perhaps in a less degree, are soya bean oil, lard oil and corn oil. Mineral oils and greases are non-drying and therefore available, but are not so effective as water-proofing agents, but the selection of the agent is naturally determined by the character of the base and also and particularly by the character of the adhesive as presently explained and of course also by the cost, because the cost affects the usefulness of the product.

One of the requirements of the varnish adhesive above referred to is that its oily base shall be a drying oil, that is to say, an oil that is naturally a drying oil, or that is made so by the addition of dryer. Such an oil, especially when bodied with rosin or gum, is convertible by proper baking into a tough elastic solid, practically waterproof. In general, any of the baking varnishes, of which there are many on the market, will be found to have its base composed principally of such oil and is therefore suitable for use. A further requirement is that such oil or the adhesive shall be miscible with the agent used for water-proofing, the fact being that an actual mixture or local solution occurs between the adhesive and the water-proofing agent on, or under the surface of the paper or base. By reason of such solution or partial solution, the adhesive comes in direct contact with the cellulose fibres of the paper surface, thus gaining an opportunity to unite firmly thereto, which cannot occur when the two agents are non-miscible, as for example, in the case where it is attempted to secure animal glue which is not soluble in oil, to paper which has been soaked in oil. A tung oil varnish, of proportions about as above described, constitutes the preferred adhesive under the principle of this invention because, after baking, it is practically unaffected by water and is also inert to many ordinary solvents likely to be accidentally encountered, besides which it is miscible with cotton-seed oil and is cheap. These same properties, though perhaps in less degree, are also present in any composition containing relatively large percentages of oils which are naturally drying like linseed oil, or oils which are made so by the addition of dryers, and consequently all such materials are properly equivalents in principle to the functions of tung oil. The gum or rosin when used in the varnish gives it body and a desirable viscosity before baking, and tends to lessen the extent of baking necessary to produce a given hardness of the adhesive. Small amounts between 5% and 15% by weight are generally sufficient for this purpose in most cases, the adhesive effect being principally if not entirely derived from the effect of baking the drying oil. Without gum, the same class of oils is available but may require bodying to secure the desired consistency to constitute an adhesive.

The duration and temperature of the baking operation are coordinated more or less to the kind of varnish or oil but with any given varnish or oil the baking may be varied to secure the desired degree of softness or pliability in the product as may be considered best for the kind of abrasive or surface coating that is used. Thus a short or moderate baking is generally best for fine grain sandpaper and a harder baking is for paper intended for more severe use. Thus an absolute control of the softness of the product is available, which is a further advantage of this invention and quite new in this art. The exact baking specifications cannot be given for all cases without reference to the kind of varnish and grade of grit but this is a matter easily determined by a very little experience. It will not be necessary to point out that the baking operation is no different from the ordinary practice in the use of baking varnishes which is very well known, and is to be distinguished from the long established practice in the sand-paper art, of air-drying the freshly glued paper by exposing it to the air in warmly heated rooms. The baking of the paper according to the requirements of this invention, which is carried on at a temperature in any event about 140° F., produces very definite results and changes in the constitution of the adhesive which no amount of air-drying could ever do and which if applied to ordinary animal-glue sand-paper would permanently impair the glue.

Inasmuch as the attainment of a secure bond between the oily or waterproof paper fibres and the adhesive is the principal object, it will be clear that the adhesive might be applied first and the waterproofing agent afterwards and likewise that the peculiar properties and virtues of the adhesive and waterproofing agents will be independently manifested by each even in the absence of the other, and all within the spirit and scope of this invention, and, furthermore, that additional materials and ingredients may be added either to the waterproofing agent or to the adhesive or both as may be desired for special purposes, without departing from the principle thereof which has been above explained.

Having thus described my invention and illustrated its use, what I claim as new and desire to secure by Letters Patent is:

1. The method of making flexible abrasive sheet material consisting in combining with a suitable base, a waterproofing agent comprising cotton-seed oil impregnated into the fibres thereof, and a separately applied grit-holding coating of adhesive miscible with the cotton-seed oil and firmly bonded with the impregnated fibres.

2. The method of making flexible abrasive sheet material consisting in combining with a sheet cellulose base, a cotton-seed oil waterproofing agent and a tung oil varnish in the form of a coating holding the grit and baking at a temperature above 140 F., thus making the coating tough, elastic and relatively pliable.

3. Flexible abrasive sheet material comprising a suitable base and a grit, said base being waterproofed with cotton-seed oil and a coating of baked tung-oil varnish co-operating with the cotton seed oil in attaching the grit to the base.

4. Waterproof sandpaper comprising a paper base and a grit, said base being treated with cotton-seed oil and with seperately applied adhesive coating attaching the grit thereto.

5. Flexible abrasive sheet material comprising a backing and a grit or layer of abrasive material secured to said backing by an adhesive composition comprising tung oil, linseed oil, rosin, and mineral spirits and dryer baked to a temperature of about 200° F.

6. Flexible abrasive sheet material including a flexible backing, said backing being immersed and saturated with cotton-seed oil thinned by the addition thereto of benzine, a grit or layer of abrasive particles secured to said backing by an adhesive composition including tung oil, linseed oil, rosin, mineral spirits and dryer.

7. Flexible abrasive sheet material including a flexible backing, said backing being immersed and saturated with cotton-seed oil thinned by the addition thereto of benzine, a grit or layer of abrasive particles secured to said backing by an adhesive composition including tung oil, linseed oil, rosin, mineral spirits and dryer, baked to a temperature of about 200° F.

In testimony whereof, I have hereunto signed my name.

GUSTAVE E. BEHR, Jr.